US012779936B2

(12) United States Patent
Zaiki et al.

(10) Patent No.: US 12,779,936 B2
(45) Date of Patent: Nov. 3, 2026

(54) AIR-CONDITIONING UNIT INSTALLED IN VEHICLE

(71) Applicant: DENSO CORPORATION, Kariya-city (JP)

(72) Inventors: Hiroyuki Zaiki, Kariya-city (JP); Shinya Kato, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 402 days.

(21) Appl. No.: 18/489,827

(22) Filed: Oct. 18, 2023

(65) Prior Publication Data

US 2024/0066944 A1 Feb. 29, 2024

Related U.S. Application Data

(63) Continuation of application No. PCT/JP2022/012720, filed on Mar. 18, 2022.

(30) Foreign Application Priority Data

Apr. 27, 2021 (JP) ................................ 2021-074920

(51) Int. Cl.
*B60H 1/00* (2006.01)

(52) U.S. Cl.
CPC ... *B60H 1/00457* (2013.01); *B60H 2001/006* (2013.01)

(58) Field of Classification Search
CPC .......... B60H 1/00457; B60H 2001/006; B60H 1/00471; B60H 1/00464; B60H 1/00278; B60H 1/00321; B60H 1/00295; B60H 1/00285
USPC .................................................... 454/139, 69
See application file for complete search history.

(56) References Cited

U.S. PATENT DOCUMENTS

| | | | | |
|---|---|---|---|---|
| 7,527,091 | B2 * | 5/2009 | Ito ...................... | B60H 1/00321 237/12.3 A |
| 2016/0185289 | A1 * | 6/2016 | Shibata .................. | B60Q 3/275 362/253 |
| 2018/0242479 | A1 | 8/2018 | Miyao | |
| 2018/0298908 | A1 | 10/2018 | Capoulun et al. | |
| 2018/0312029 | A1 * | 11/2018 | Ito ...................... | B60H 1/00064 |
| 2020/0223289 | A1 | 7/2020 | Maeda | |
| 2021/0362559 | A1 | 11/2021 | Yonezu et al. | |

(Continued)

FOREIGN PATENT DOCUMENTS

| | | | |
|---|---|---|---|
| DE | 102019002744 | A1 | 10/2020 |
| JP | 2004196134 | A | 7/2004 |
| JP | 2016120902 | A | 7/2016 |

(Continued)

*Primary Examiner* — Avinash A Savani
*Assistant Examiner* — Ryan L Faulkner
(74) *Attorney, Agent, or Firm* — Harness, Dickey & Pierce, P.L.C.

(57) ABSTRACT

An air-conditioning unit installed in a vehicle includes: an air-conditioning case; a blower to send air from the air-conditioning case into a cabin of the vehicle; a blower motor to drive the blower; and a functional component to realize a part of an air-conditioning function in the air-conditioning case. The functional component is disposed between a noise source of the blower motor that generates electromagnetic noise and a protection region that is at least a part of the cabin, and includes a substance that shields the electromagnetic noise.

18 Claims, 7 Drawing Sheets

(56) References Cited

U.S. PATENT DOCUMENTS

| | | | | |
|---|---|---|---|---|
| 2022/0185059 | A1* | 6/2022 | Terai | B60H 1/00285 |

FOREIGN PATENT DOCUMENTS

| | | | | | |
|---|---|---|---|---|---|
| JP | 2018131154 | A | | 8/2018 | |
| JP | 2018525956 | A | | 9/2018 | |
| JP | 2019061365 | | * | 3/2019 | B60H 1/00 |
| JP | 2020131959 | A | | 8/2020 | |
| JP | 2021003958 | A | | 1/2021 | |
| WO | WO-2019077960 | A1 | | 4/2019 | |
| WO | WO-2020170754 | A1 | | 8/2020 | |

* cited by examiner

AIR-CONDITIONING UNIT INSTALLED IN VEHICLE

CROSS REFERENCE TO RELATED APPLICATION

The present application is a continuation application of International Patent Application No. PCT/JP2022/012720 filed on Mar. 18, 2022, which designated the U.S. and claims the benefit of priority from Japanese Patent Application No. 2021-074920 filed on Apr. 27, 2021. The entire disclosures of all of the above applications are incorporated herein by reference.

TECHNICAL FIELD

The present disclosure relates to an air-conditioning unit installed in a vehicle.

BACKGROUND

Conventionally, an air-conditioning unit mounted on a vehicle includes a blower that sends air for conditioning a vehicle interior. A motor is used as a power source of the blower.

SUMMARY

According to an aspect of the present disclosure, an air-conditioning unit installed in a vehicle includes: an air-conditioning case; a blower to send air from the air-conditioning case into a cabin of the vehicle; a blower motor to drive the blower; and a functional component to realize a part of an air-conditioning function in the air-conditioning case. The functional component is disposed between a noise source of the blower motor that generates electromagnetic noise and a protection region that is at least a part of the cabin, and includes a substance that shields the electromagnetic noise.

DETAILED DESCRIPTION

It is known that a motor generates electromagnetic noise at the time of operation, and the electromagnetic noise may adversely affect the operation of an electronic device (such as an electronic wireless key) in the vehicle cabin. The inventors have studied covering the motor with a conductive metal cover in order to shield electromagnetic noise. However, according to the study by the inventors, if a dedicated member not for the air-conditioning is provided in order to shield electromagnetic noise, the size and weight of the air-conditioning unit increase. In addition, since the number of components of the air-conditioning unit increases, the cost increases.

The present disclosure provides an air-conditioning unit installed in a vehicle to suppress an adverse effect of electromagnetic noise generated in a motor of a blower without providing a dedicated member not for air-conditioning function.

According to an aspect of the present disclosure, an air-conditioning unit installed in a vehicle includes: an air-conditioning case; a blower to send air from the air-conditioning case into a cabin of the vehicle; a blower motor to drive the blower; and a functional component to realize a part of an air-conditioning function in the air-conditioning case. The functional component is disposed between a noise source of the blower motor that generates electromagnetic noise and a protection region that is at least a part of the cabin, and includes a substance that shields the electromagnetic noise.

This increases the possibility of good operation of an electronic device placed in the protection region. A functional component that realizes a part of the air-conditioning function is used as a component that shields electromagnetic noise as described above. Therefore, it is possible to suppress an excessive increase in the size, weight, and number of components of the air-conditioning unit not for the air-conditioning function but for shielding electromagnetic noise.

First Embodiment

Figure 1:
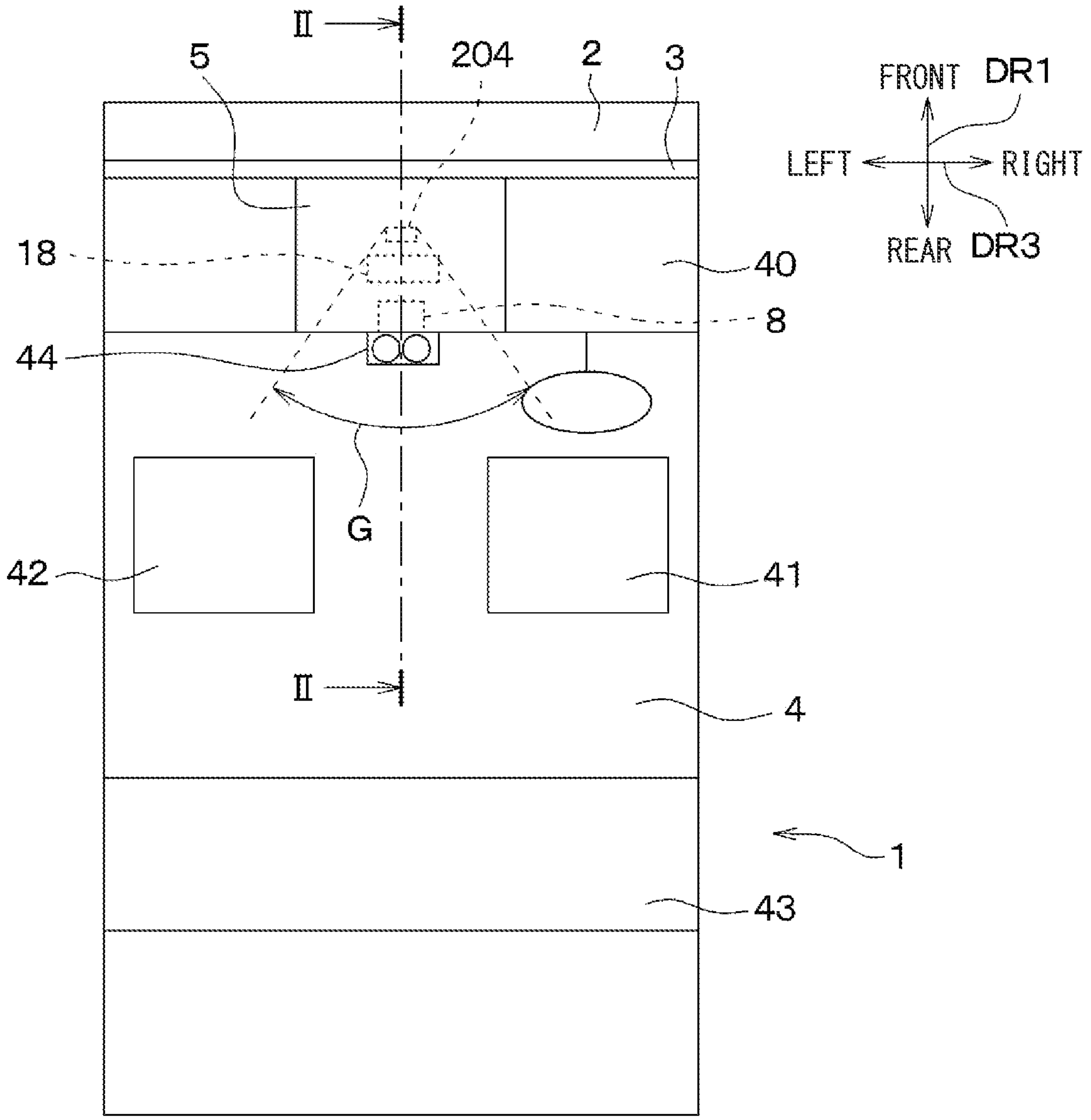
FIG. 1 is a schematic configuration diagram illustrating a vehicle according to a first embodiment.
Figure 2:
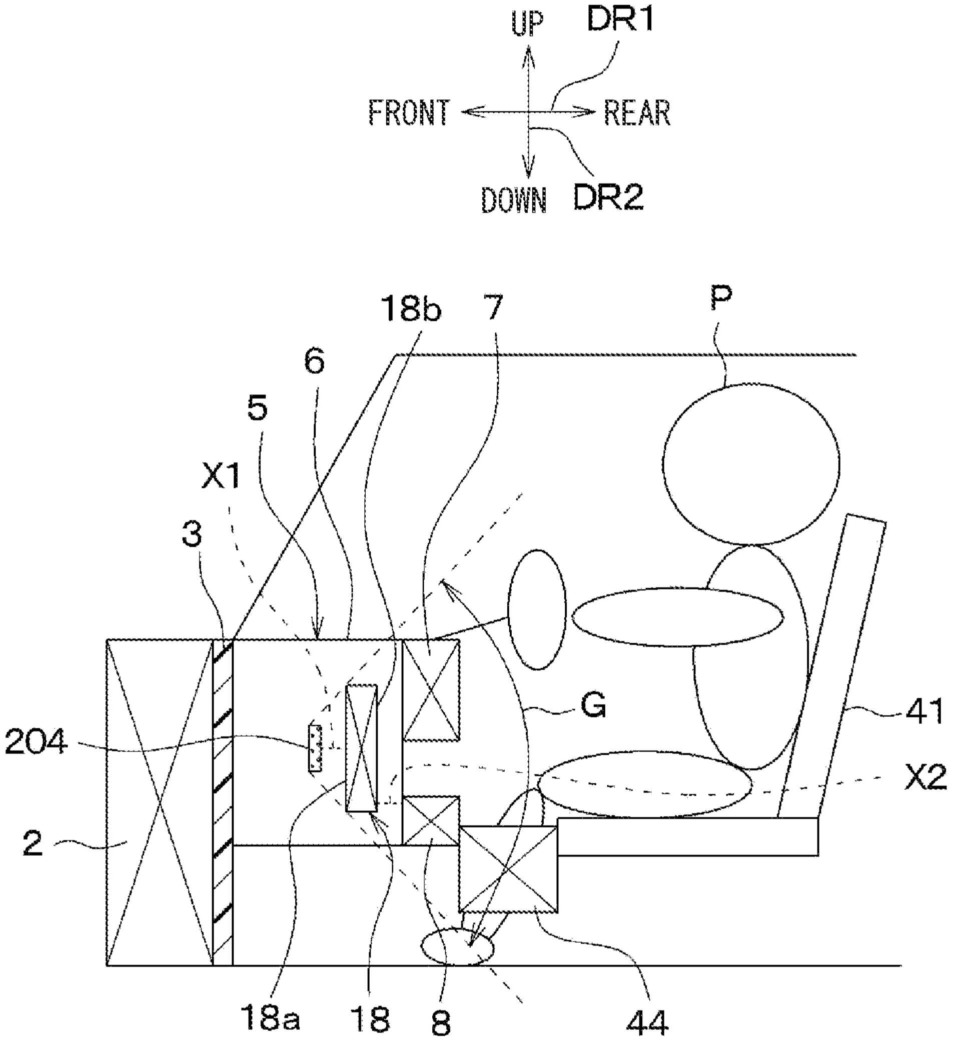
FIG. 2 is a schematic cross-sectional view taken along line II-II of FIG. 1.

A first embodiment will be described. An air conditioner according to the present embodiment is mounted on a vehicle 1 illustrated in FIG. 1. As shown in FIGS. 1 and 2, the vehicle 1 is provided with an engine room 2, a firewall 3, and a vehicle cabin 4.

Arrows DR1, DR2, and DR3 in FIGS. 1 and 2 indicate directions with respect to the vehicle 1. That is, the arrow DR1 indicates the front-rear direction of the vehicle 1, the arrow DR2 indicates the up-down direction of the vehicle 1, and the arrow DR3 indicates the width direction of the vehicle 1.

The engine room 2 is located on the front side of the firewall 3 and the vehicle cabin 4 in the front-rear direction DR1, and a device that generates power for driving the vehicle 1 (such as an internal combustion engine and an electric motor) is disposed in the engine room 2. The firewall 3 is a partition wall that separates the engine room 2 and the vehicle cabin 4 from each other in the front-rear direction DR1.

The vehicle cabin 4 is disposed on the rear side of the firewall 3 in the front-rear direction DR1, for the occupant P of the vehicle 1. A dashboard 40, a driver seat 41, a front passenger seat 42, a rear seat 43, a cup holder 44, an air-conditioning unit 6, and the like are arranged in the vehicle cabin 4. The driver seat 41 and the front passenger seat 42 correspond to a front seat. The driver seat 41 and the front passenger seat 42 are located on the right side and the left side, respectively, in FIG. 1. However, as another example, the driver seat 41 may be located on the left side and the front passenger seat 42 may be located on the right side.

The dashboard 40 is located on the front side of the driver seat 41 and the front passenger seat 42 in the front-rear direction DR1, and is located on the rear side of the engine room 2. The dashboard 40 is disposed from the right end to the left end of the vehicle in the front-rear direction DR1. The dashboard 40 includes a center console 5 at a central portion in the width direction DR3. The center console 5 is disposed between the driver seat 41 and the front passenger seat 42 in the width direction DR3, and is disposed in front of the driver seat 41 and the front passenger seat 42 in the front-rear direction DR1.

The center console 5 includes an operation display panel 7 and an article holder 8. The operation display panel 7 displays information and receives a user operation for controlling an in-vehicle device. The center console 5 may include, for example, one or both of a navigation device and an air-conditioning control panel.

The article holder 8 is a holding member provided to hold and store small articles in the vehicle cabin 4. The small article is portable by an occupant of the vehicle 1, and corresponds to, for example, a coin, a card, a key, an electronic wireless key, a portable information communication terminal, or the like. The electronic wireless key is carried by the occupant and performs wireless communication with the vehicle 1 to permit operations such as locking a door of the vehicle, unlocking the door, and turning on a main switch.

The main switch turns on and off a main power supply for enabling the vehicle 1 to travel by an accelerator operation. The main switch is an ignition switch that permits energization for starting the internal combustion engine when the vehicle 1 includes the internal combustion engine. When the vehicle 1 does not have an internal combustion engine but has an electric motor for traveling, the main switch permits energization of the electric motor based on an accelerator operation.

The article holder 8 may be capable of transitioning between a state in which the article holder 8 is stored inside the center console 5 and a state in which the article holder 8 protrudes from the center console 5 rearward in the front-rear direction DR1 such that small articles can be taken in and out. In the former state, the occupant cannot touch the small item held in the article holder 8, but in the latter state, the occupant can touch the small item held in the article holder 8.

The position of the article holder 8 in the width direction DR3 is between the position of the driver seat 41 in the width direction DR3 and the position of the front passenger seat 42 in the width direction DR3.

The cup holder 44 is a holding member provided to hold a container. The container may be filled with a beverage (such as a paper cup and a PET bottle), or may be capable of storing small articles as described above (such as a paper cup and a cup-shaped small article case). When the cup holder 44 holds the container in which the small item is stored, the cup holder 44 holds the small item at the same time. The occupant can touch the small article held by the cup holder 44.

As shown in FIGS. 1 and 2, the cup holder 44 may be attached to the center console 5. More specifically, the cup holder 44 may be disposed on the rear side of the center console 5 in the front-rear direction DR1 so as to protrude from the surface of the center console 5. The position of the cup holder 44 in the width direction DR3 may be between the position of the driver seat 41 in the width direction DR3 and the position of the front passenger seat 42 in the width direction DR3. Alternatively, the cup holder 44 may be provided between the driver seat 41 and the front passenger seat 42. The cup holder 44 may be provided at the time of manufacturing the vehicle 1. Alternatively, the cup holder 44 may be a retrofitted commercially available product, and may be attached to an arbitrary place in the vehicle cabin by a user of the vehicle 1 after manufacturing the vehicle 1.

Figure 3:
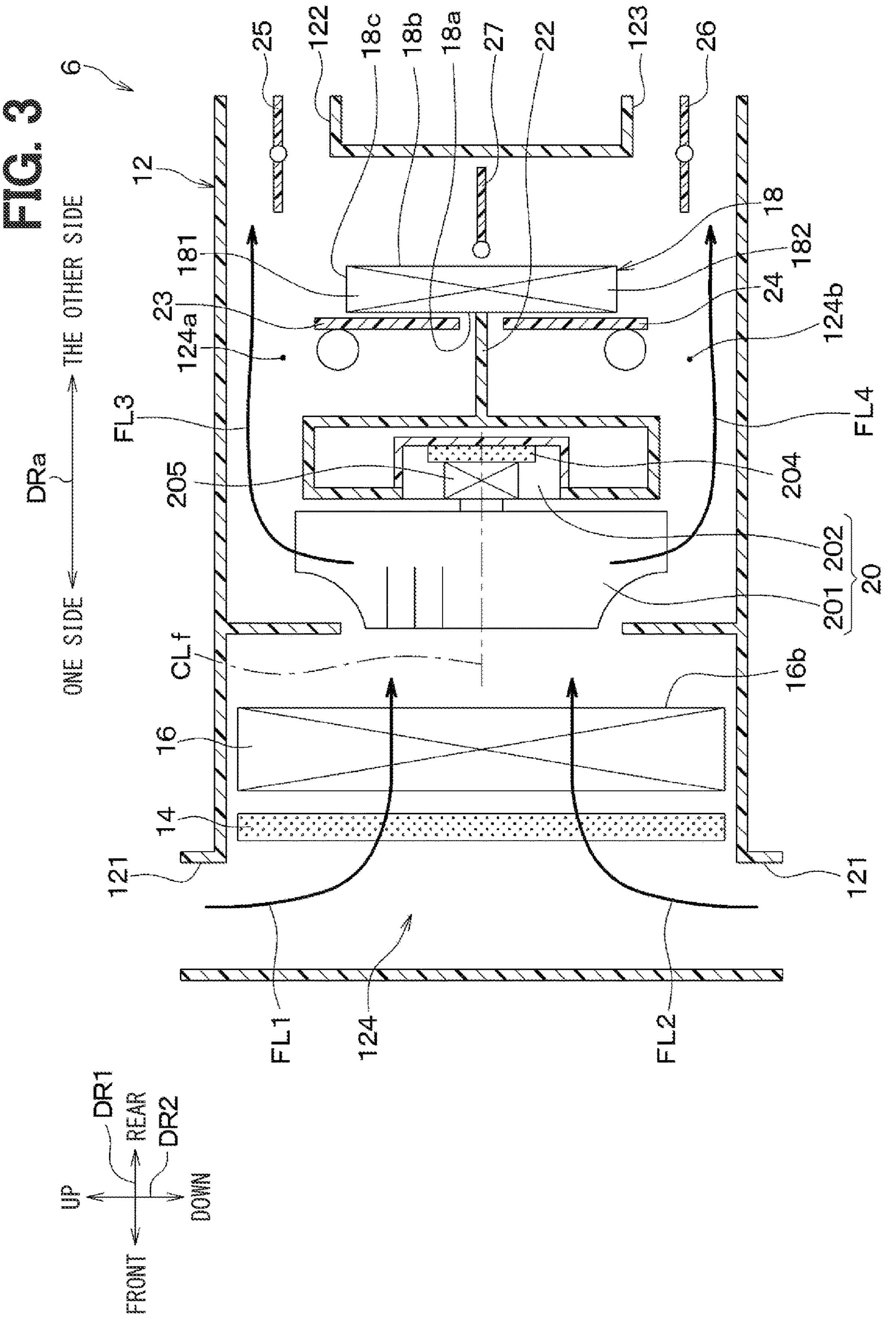
FIG. 3 is a sectional view illustrating an air-conditioning unit.

The air-conditioning unit 6 is disposed inside the center console 5 in the vehicle cabin 4. As shown in FIG. 3, the air-conditioning unit 6 includes an air-conditioning case 12, a filter 14, an evaporator 16, a heater core 18, a blower 20, an upper layer air mix door 23, a lower layer air mix door 24, a face door 25, a foot door 26, and an upper and lower communication door 27.

The air-conditioning case 12 is made of a resin member that forms an outer shell of the air-conditioning unit 6. The air-conditioning case 12 has plural air inlets 121, a face opening 122, and a foot opening 123. A case inner passage 124 through which air flows is formed inside the air-conditioning case 12. Each of the air inlets 121 has an air vent for introducing outside air, which is air outside the vehicle cabin, or inside air, which is air inside the vehicle cabin, from outside the air-conditioning case 12 into the case inner passage 124. The air vent is connected to an upstream side of the case inner passage 124 in the air flow. Each of the air inlets 121 is provided with an inside/outside air switching door (not shown), and the inside/outside air switching door switches the air flowing into the air inlet 121 between inside air and outside air.

Each of the face opening 122 and the foot opening 123 has a vent for allowing air to flow out of the case inner passage 124 into the vehicle interior, which is outside of the air-conditioning case 12. The vent is connected to the downstream side of the case inner passage 124 in the air flow. Therefore, the air in the case inner passage 124 flows into the vehicle interior through the face opening 122 or the foot opening 123. Arrows FL1, FL2, FL3, and FL4 in FIG. 1 indicate the air flow in the case inner passage 124.

The filter 14 is disposed on the downstream side of the air inlets 121 in the air flow in the case inner passage 124, to capture dust and the like contained in the air passing through the filter 14.

The evaporator 16 is disposed on the downstream side of the filter 14 in the case inner passage 124. The evaporator 16 cools the air flowing through the case inner passage 124. For example, the evaporator 16 constitutes a well-known refrigeration cycle apparatus that circulates a refrigerant, together with a compressor, a condenser, and an expansion valve (not shown). In the evaporator 16, heat is exchanged between the air passing through the evaporator 16 and another medium (that is, a refrigerant), to evaporate the refrigerant and to cool the air. The compressor and the condenser may be disposed, for example, in the engine room 2. As described above, the evaporator 16 is a cooling heat exchanger that realizes a function of cooling the air sent from the air-conditioning case 12 to the vehicle cabin 4. This cooling function corresponds to a part of the air-conditioning function.

The outer shape of the evaporator 16 is a plate shape. That is, the outer shape of the evaporator 16 has two opposing plate surfaces and a side surface connecting between the two plate surfaces.

The evaporator 16 contains a substance having an electromagnetic wave shielding property. For example, a substance having an electromagnetic wave shielding property is contained in an amount of 10 wt % or more. Specifically, the evaporator 16 includes tubes through which the refrigerant flows, a first tank communicating with ends of the tubes, and a second tank communicating with the other ends of the tubes. The tubes, the first tank, and the second tank are made of a material having an electromagnetic wave shielding property. Examples of the substance having an electromagnetic wave shielding property is a conductive material and a magnetic material. The substance having an electromagnetic wave shielding property is, for example, a conductive metal such as aluminum, but may be a substance (for example, carbon fiber) other than the conductive metal.

The blower 20 includes a blower fan 201 disposed in the case inner passage 124 to rotate around a fan axis CLf, and a blower motor 202 that rotationally drives the blower fan 201. The blower 20 is disposed on the downstream side of the evaporator 16 in the air flow in the air-conditioning case 12.

The blower fan 201 is a centrifugal fan that is rotated by the blower motor 202 to generate an air flow in the case inner passage 124. The blower fan 201 sucks air from one side in the fan axial direction DRa of the fan axis CLf by the rotation of the blower fan 201, and blows the sucked air outward in the radial direction of the blower fan 201. The air blown outward in the radial direction is guided by the inner wall surface of the air-conditioning case 12 as indicated by the arrows FL3 and FL4, and flows toward the downstream side of the blower fan 201 in the case inner passage 124, that is, rearward in the front-rear direction DR1.

The blower motor 202 is an electric brushless motor that rotates the blower fan 201 by being energized. The blower motor 202 includes a circuit unit 204 and a mechanism unit 205. The circuit unit 204 includes a circuit board and a driver circuit mounted on the circuit board. The mechanism unit 205 includes a rotor, a stator, and a shaft. The stator generates a magnetic force by a current supplied from the driver circuit, and the rotor rotates by a change in the magnetic force. The shaft rotates together with the rotor by receiving a rotational force from the rotor, and the blower fan 201 is rotated by the rotational force.

The driver circuit includes an inverter unit or the like that repeatedly switches the flowing direction of current flowing from the driver circuit to the stator at a timing in accordance with the rotation of the rotor. By repeatedly switching the flowing direction of current flowing from the driver circuit to the stator, the magnetic force generated by the stator repeatedly changes, and the blower fan 201 continuously rotates as described above. Electromagnetic noise is generated when the inverter switches the flowing direction of current.

Thus, the circuit unit 204 of the blower motor 202 is a noise source that generates electromagnetic noise. When the electromagnetic noise is emitted to the electronic device in the vehicle cabin 4 with a strong intensity, the operation of the electronic device may become unstable. For example, when the electromagnetic noise is emitted to the above-described electronic wireless key with high intensity, there is a possibility that the communication between the electronic wireless key and the vehicle 1 is disturbed. Also in the portable information communication terminal, the communication with the external unit outside the vehicle 1 may be interrupted.

The blower 20 has a suction-type layout in which the blower fan 201 is located downstream of the evaporator 16 in the air flow. The blower 20 is arranged so that one side in the fan axial direction DRa, which is an air suction side of the blower fan 201, faces an air outflow surface 16*b* of the evaporator 16. Therefore, the blower fan 201 is disposed such that the other side of the fan axis CLf that coincides with the other side of the fan axial direction DRa faces to the downstream side of the case inner passage 124 in the air flow.

The blower 20 having such a configuration sucks air from the evaporator 16 in the air-conditioning case 12 as indicated by the arrows FL1 and FL2, and blows the sucked air toward the face opening 122 and the foot opening 123 as indicated by the arrows FL3 and FL4. Thus, the blower 20 realizes a function of sending the air from the air-conditioning case 12 into the vehicle cabin 4. The blower 20 and the circuit unit 204 are located between the driver seat 41 and the front passenger seat 42 in the width direction DR3.

The air-conditioning unit 6 further includes a case inner partition wall 22. The case inner partition wall 22 partitions a passage of the case inner passage 124 downstream side of the blower fan 201 into a first downstream passage 124*a* and a second downstream passage 124*b* extending in parallel with each other. The first downstream passage 124*a* is disposed on the right side of the case inner partition wall 22 in the up-down direction DR2, and the second downstream passage 124*b* is disposed on the left side of the case inner partition wall 22 in the up-down direction DR2.

The heater core 18 is disposed on the downstream side of the blower fan 201 in the case inner passage 124 in the air-conditioning case 12. The position of the heater core 18 in the width direction DR3 is between the position of the driver seat 41 in the width direction DR3 and the position of the front passenger seat 42 in the width direction DR3.

The outer shape of the heater core 18 is a plate shape. That is, the outer shape of the heater core 18 has two opposing plate surfaces 18*a*, 18*b* and a side surface 18*c* connecting between the two plate surfaces 18*a*, 18*b*.

The heater core 18 heats the air passing through the heater core 18 from the blower fan 201. More specifically, the heater core 18 heats the air passing through the heater core 18 by exchanging heat with another medium such as a high-temperature heat medium flowing inside the heater core 18. The high-temperature heat medium may be, for example, a refrigerant compressed by the compressor, or may be high-temperature engine cooling water. The heater core 18 is a heating heat exchanger that realizes a function of heating the air sent from the air-conditioning case 12 to the vehicle cabin 4. This heating function corresponds to a part of the air-conditioning function.

The heater core 18 is disposed to extend over both the first downstream passage 124*a* and the second downstream passage 124*b*. Accordingly, the heater core 18 includes a first heating portion 181 disposed in the first downstream passage 124*a* and a second heating portion 182 disposed in the second downstream passage 124*b*.

The heater core 18 includes a substance having an electromagnetic wave shielding property. For example, a substance having an electromagnetic wave shielding property is contained in an amount of 10 wt % or more. Specifically, the heater core 18 includes tubes in which the heat medium flows, a first tank communicated with ends of the tubes, and a second tank communicated with the other ends of the tubes. The tubes, the first tank, and the second tank are made of a material having an electromagnetic wave shielding property. Examples of the substance having an electromagnetic wave shielding property include a conductive material and a magnetic material. The substance having an electromagnetic wave shielding property is, for example, a conductive metal such as aluminum, but may be a substance other than the conductive metal (for example, carbon fiber). In the air-conditioning unit 6, the evaporator 16, the blower 20, and the heater core 18 are arranged in this order in the front-rear direction DR1.

The upper layer air mix door 23 and the lower layer air mix door 24 are disposed downstream of the blower fan 201 in the air flow in the air-conditioning case 12. For example, each of the upper layer air mix door 23 and the lower layer air mix door 24 is a sliding door mechanism, and is slid by an electric actuator.

Specifically, the upper layer air mix door 23 is disposed on the upstream side of the first heating portion 181 of the heater core 18 with respect to the air flow in the first downstream passage 124*a*. The upper layer air mix door 23 adjusts the ratio between the volume of the air passing through the first heating portion 181 and the volume of the air bypassing the first heating portion 181. Thus, the temperature of the air blown into the vehicle interior through the first downstream passage 124*a* is adjusted.

The lower layer air mix door 24 is disposed on the upstream side of the second heating portion 182 of the heater core 18 in the second downstream passage 124*b*. The lower layer air mix door 24 adjusts the ratio between the volume of air passing through the second heating portion 182 and the volume of air bypassing the second heating portion 182. Accordingly, the temperature of the air blown into the vehicle interior through the second downstream passage 124*b* is adjusted.

The air-conditioning case 12 has the face opening 122 on the downstream side of the first heating portion 181 of the heater core 18 in the air flow, and has the foot opening 123 on the downstream side of the second heating portion 182 of the heater core 18 in the air flow. The face opening 122 blows out air to the vicinity of the face of an occupant on the driver seat 41 or the front passenger seat 42. The foot opening 123 blows out air to the vicinity of the leg of an occupant on the driver seat 41 or the front passenger seat 42. The air-conditioning case 12 may have an opening for blowing air into the vehicle cabin 4 in addition to the face opening 122 and the foot opening 123.

The upper and lower communication door 27 is disposed on the downstream side of the heater core 18 in the air flow in the case inner passage 124 and at the boundary between the first downstream passage 124*a* and the second downstream passage 124*b*. The upper and lower communication door 27 is an opening and closing door. The first downstream passage 124*a* and the second downstream passage 124*b* communicate with each other when the upper and lower communication door 27 is at the open position. When the upper and lower communication door 27 is at the closed position, the communication between the first downstream passage 124*a* and the second downstream passage 124*b* is blocked.

The positional relationship among the circuit unit 204, which is a noise source, the heater core 18, the cup holder 44, and the article holder 8 will be described with reference to FIGS. 1 and 2. The heater core 18 is disposed between the circuit unit 204 and the protection region G. Accordingly, a part or the whole of the circuit unit 204 is hidden from the protection region G by the heater core 18. That is, for any combination of the position included in the protection region G and the position included in the part or the whole of the circuit unit 204, a straight line connecting the two positions penetrates the heater core 18.

As shown in FIGS. 1 and 2, the protection region G includes a part of a space region outside the air-conditioning unit 6 in the vehicle cabin 4. The protection region G includes a part of a space region outside the dashboard 40 in the vehicle cabin 4. More specifically, the circuit unit 204 and the heater core 18 are arranged such that the protection region G includes the position of the article holder 8 and the position of the cup holder 44. Both in a state of being stored in the center console 5 and in a state of protruding from the center console 5, the article holder 8 is within the protection region G.

As shown in FIGS. 1 and 2, one plate surface 18*a* of the outer shape of the heater core 18 faces the circuit unit 204. That is, a perpendicular line X1 can be virtually drawn perpendicularly from a part or all of the circuit unit 204 to the one plate surface 18*a*.

The other plate surface 18*b* of the outer shape of the heater core 18 faces the article holder 8. That is, the perpendicular line X2 can be virtually drawn perpendicularly from a part or all of the article holder 8 to the other plate surface 18*b*. Note that the other plate surface 18*b* of the outer shape of the heater core 18 faces the article holder 8 in both a state where the article holder 8 is stored in the center console 5 and a state where the article holder 8 protrudes from the center console 5. The other plate surface 18*b* of the outer shape of the heater core 18 does not face the cup holder 44, but may face the cup holder as another example.

The operation of the air-conditioning unit 6 configured as described above will be described. During operation of the air-conditioning unit 6, the circuit unit 204 of the blower motor 202 is energized. Therefore, current flows from the circuit unit 204 to the stator of the mechanism unit 205 and the flowing direction of current repeatedly changes. As a result, the rotor and the shaft of the mechanism unit 205 continuously rotate, and the blower fan 201 continuously rotates.

By the rotation of the blower fan 201, air is introduced into the air-conditioning case 12 as indicated by the arrows FL1 and FL2, passes through the filter 14 and the evaporator 16 to be sucked into the blower fan 201, and is blown out from the outer periphery of the blower fan 201. The blown air flows into the first downstream passage 124*a* and the second downstream passage 124*b* as indicated by the arrows FL3 and FL4. The air passes through or bypasses the first heating portion 181, passes through openings such as the face opening 122 or the foot opening 123, and is blown into the vehicle cabin 4. At this time, at the time of cooling, the air flowing into the vehicle cabin 4 through the air-conditioning case 12 is cooled by the evaporator 16. During heating, the air passing through the air-conditioning case 12 to enter the vehicle cabin 4 is cooled by the evaporator 16. The opening degrees of the upper layer air mix door 23, the lower layer air mix door 24, the face door 25, the foot door 26, and the upper and lower communication door 27 are adjusted as necessary in such an operation.

When an occupant gets on the vehicle 1 and the air-conditioning unit 6 is operated to continuously rotate the blower fan 201, electromagnetic noise is generated in the circuit unit 204, and the electromagnetic noise is radiated. However, the heater core 18 shields the electromagnetic noise. As a result, the influence of the electromagnetic noise in the protection region G of the vehicle cabin 4 is greatly reduced.

As described above, the heater core 18 is disposed between the circuit unit 204 that generates electromagnetic noise in the blower motor 202 and the protection region G of the vehicle cabin 4, to shield electromagnetic noise generated in the circuit unit 204 and propagating toward the protection region G.

As a result, there is no influence on the operation of the electronic devices placed in the article holder 8 and the cup holder 44 in the protection region G. For example, communication between the electronic wireless key and the receiver mounted on the vehicle 1 is favorably performed without being disturbed by the electromagnetic noise. The heater core 18, which is a functional component for realizing a part of the air-conditioning function, is used as a component for shielding electromagnetic noise in this manner. Therefore, it is possible to suppress an excessive increase in the size, weight, and number of components of the air-conditioning unit 6 not only for the air-conditioning function but only for shielding electromagnetic noise.

(1) Further, the circuit unit 204 and the heater core 18 are disposed in the protection region G so as to include the positions of the article holder 8 and the cup holder 44 provided to hold an article carried by the occupant in the vehicle cabin 4.

There is a high possibility that an electronic device such as an electronic wireless key or a portable information communication terminal is placed in the article holder 8 or the cup holder 44 provided to hold an object carried by an occupant in the vehicle cabin 4. Therefore, when the article holder 8 and the cup holder 44 are included in the protection region G, even if the electronic device is placed in the article holder 8, the operation of the electronic device is not adversely affected.

(2) The position of the circuit unit 204 in the width direction DR3 is between the driver seat and the passenger seat, and the positions of the article holder 8 and the cup holder 44 in the width direction DR3 are between the driver seat 41 and the front passenger seat 42.

In this manner, the article holder 8 and the cup holder 44 are disposed at positions suitable for the occupant to place an electronic device such as an electronic wireless key or a portable information communication terminal. Moreover, the circuit unit 204, which is a noise source, is located at a position in the width direction DR3 corresponding to such a position. In such a case, the electromagnetic noise is likely to adversely affect the operation of the electronic device. In such a situation, the heater core 18 is located between the circuit unit 204 and the article holder 8 or the cup holder 44 to shield electromagnetic noise. Thus, the function of the heater core 18 to shield electromagnetic noise is effectively useful.

(3) The outer shape of the heater core 18 is a plate shape. The one plate surface 18*a* of the heater core 18 faces the circuit unit 204 which is a noise source. In addition, the other plate surface 18*b* of the heater core 18 faces the article holder 8. As described above, the position of the article holder 8 can be favorably protected from electromagnetic noise due to the posture of the heater core 18 that effectively utilizes the fact that the outer shape of the heater core 18 is a plate shape.

(4) In addition, a heat exchanger in which heat is exchanged with the air in the air-conditioning case 12 is adopted as a functional component for shielding electromagnetic noise. There are many options for materials that can realize electromagnetic wave shielding properties while maintaining high heat transfer performance, which is an original function of a heat exchanger, such as various conductive metals and carbon fibers. That is, the affinity between the heat transfer performance and the electromagnetic wave shielding property is high. Therefore, the heat exchanger is convenient as a shield against electromagnetic noise.

(5) The blower 20 is located downstream of the evaporator 16 and upstream of the heater core 18 in the air flow in the air-conditioning case 12. With such a layout in the air-conditioning case 12, the blower 20 is closer to the heater core 18 than in a conventional layout in which the blower 20 is located upstream of the heater core 18 and the evaporator 16 in the air flow. As a result, the heater core 18 becomes more effective as a functional component that shields electromagnetic noise from the circuit unit 204.

Second Embodiment

Figure 4:
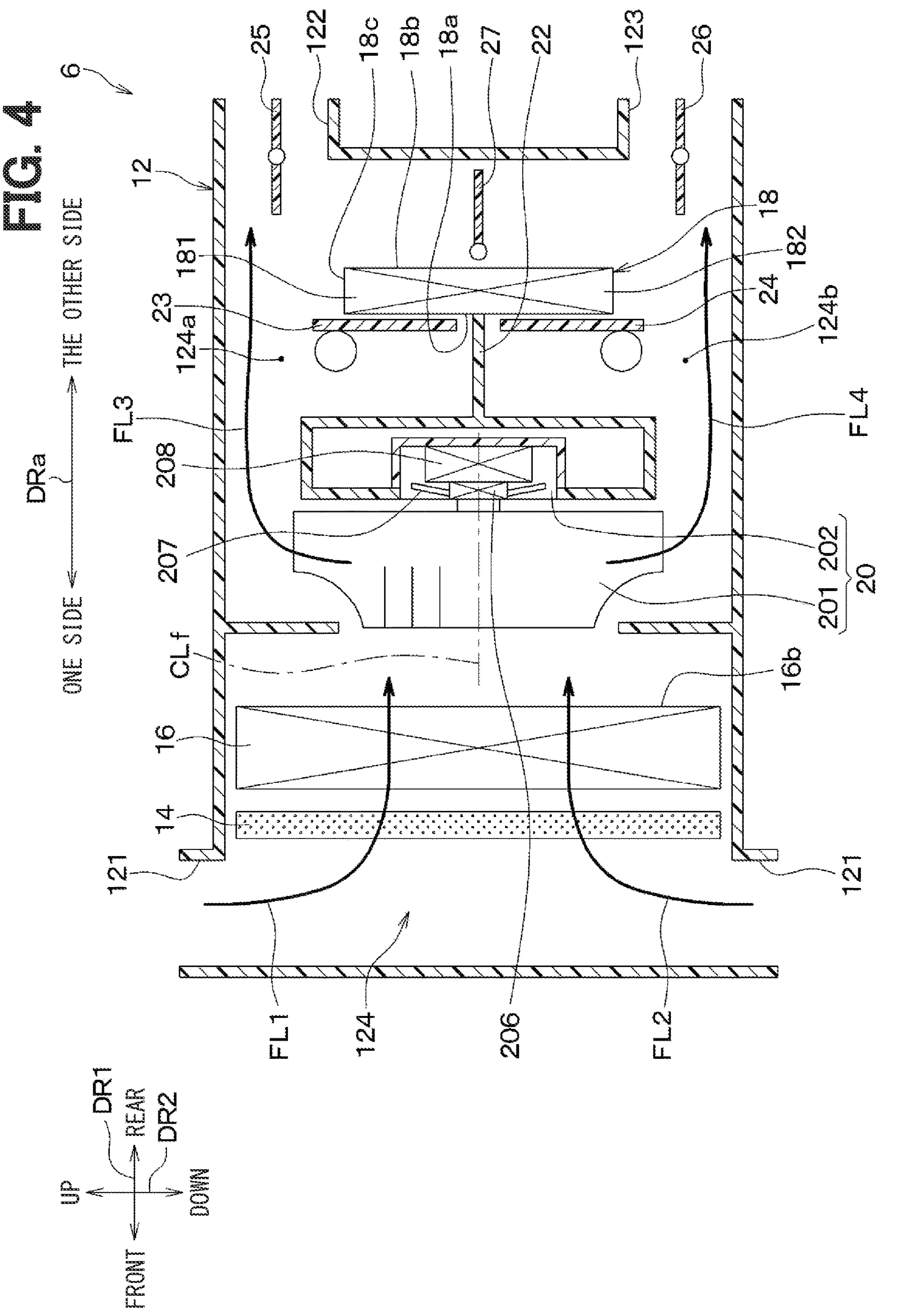
FIG. 4 is a sectional view illustrating an air-conditioning unit according to a second embodiment.

Next, the second embodiment will be described with reference to FIG. 4. The present embodiment is different from the first embodiment in the configuration of the blower motor 202. The blower motor 202 of the first embodiment is a brushless motor, but the blower motor 202 of the present embodiment is a brushed motor.

Specifically, the blower motor 202 includes a commutator 206, a brush 207, and a mechanism unit 208. The brush 207 supplies a current to the commutator 206. The mechanism unit 208 includes a rotor, a stator, and a shaft. The stator generates a magnetic force by a current supplied from the commutator 206, and the rotor rotates by a change in the magnetic force. The shaft rotates together with the rotor by receiving a rotational force from the rotor, and the blower fan 201 is rotated by the rotational force. The commutator 206 slides with respect to the brush 207 by rotating together with the rotor, and the contact position with the brush 207 is repeatedly switched. Due to this sliding, the flowing direction of current flowing from the brush 207 to the commutator 206 changes. As a result, the magnetic force generated by the rotor changes, such that the stator and the shaft continuously rotate. The rotational force of the shaft is transmitted to the blower fan 201, and the blower fan 201 continuously rotates.

Even in such a brushed motor, spark noise is generated when the contact position between the commutator 206 and the brush 207 is switched. The spark noise corresponds to electromagnetic noise. The commutator 206 and the brush 207 of the blower motor 202 are noise source that generates electromagnetic noise. When the electromagnetic noise is emitted to the electronic device in the vehicle cabin 4 with a strong intensity, the operation of the electronic device may become unstable. For example, when the electromagnetic noise is emitted to the electronic wireless key with high intensity, there is a possibility that communication between the electronic wireless key and the receiver mounted on the vehicle 1 is disturbed. The same applies to the portable information communication terminal although the communication partner is different.

The position of the blower motor 202 of the present embodiment in the air-conditioning unit 6 is the same as the position of the blower motor 202 of the first embodiment. Therefore, the positional relationship of the heater core 18, the cup holder 44, and the article holder 8 with respect to the commutator 206 and the brush 207 is similar to the positional relationship of the heater core 18, the cup holder 44, and the article holder 8 with respect to the circuit unit 204 of the first embodiment.

Therefore, the heater core 18 is disposed between the commutator 206 and the brush 207, which generate electromagnetic noise in the blower motor 202, and the protection region G of the vehicle cabin 4, and shields the electromagnetic noise generated by the commutator 206 and the brush 207 and propagating toward the protection region G. Therefore, it is possible to obtain the same effects as in the first embodiment.

The positional relationship between the protection region G, the cup holder 44, and the article holder 8 is the same as that of the first embodiment. The posture of the one plate surface 18*a* of the outer shape of the heater core 18 with respect to the commutator 206 and the brush 207 is the same as the posture of the one plate surface 18*a* with respect to the circuit unit 204 in the first embodiment. The other configurations are the same as those of the first embodiment. Effects similar to those of the first embodiment can be obtained from a configuration similar to those of the first embodiment.

Third Embodiment

Figure 6:
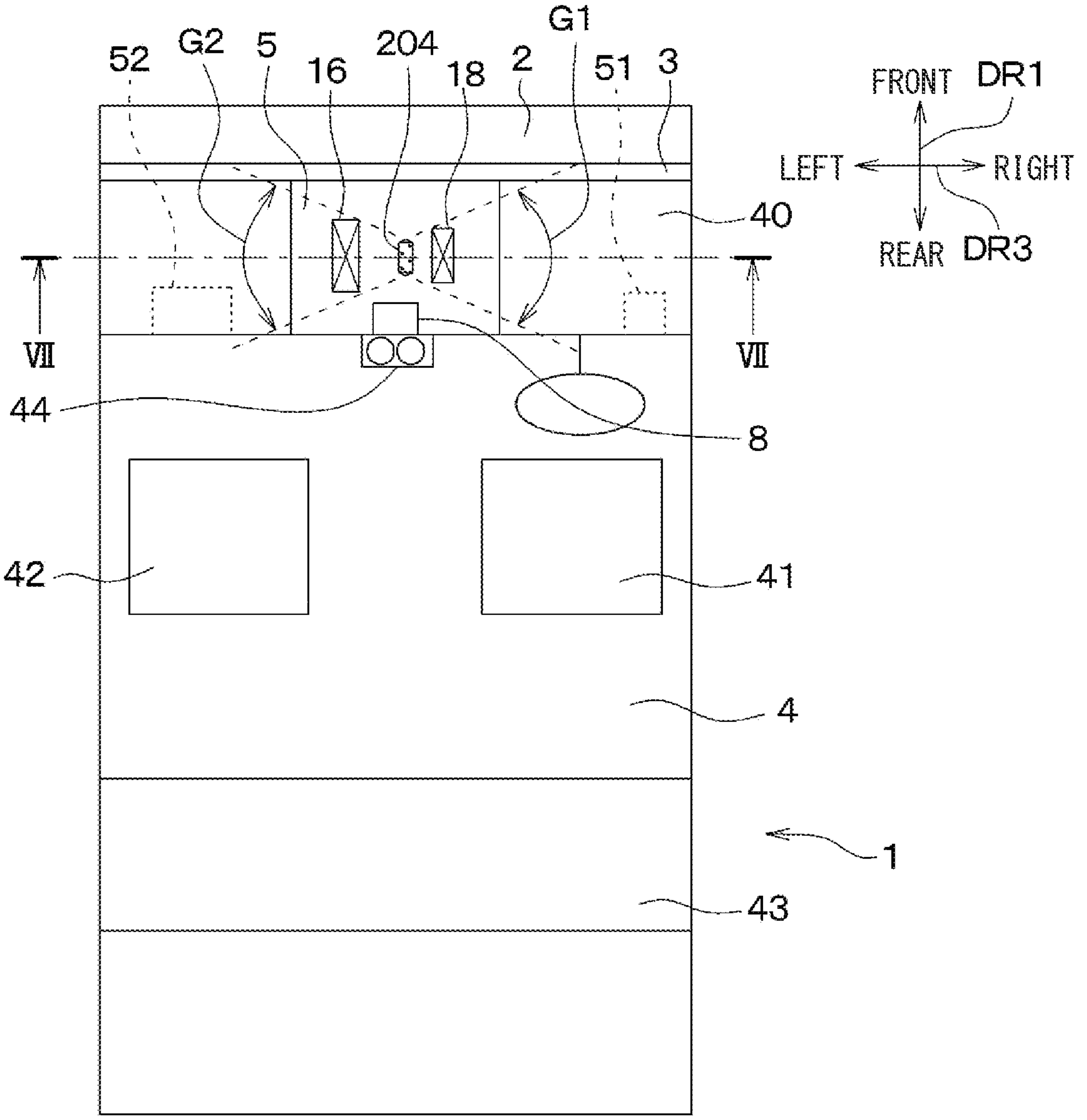
FIG. 6 is a schematic configuration diagram illustrating a vehicle.
Figure 7:
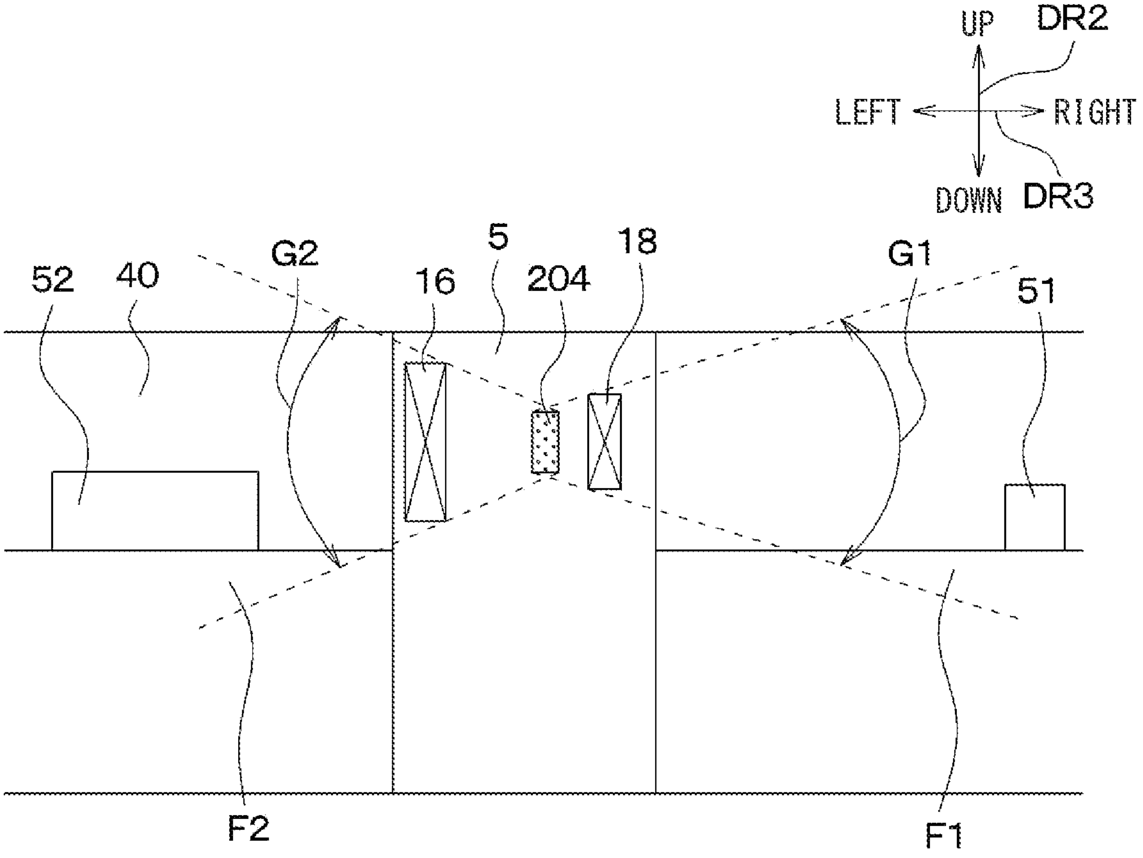
FIG. 7 is a schematic cross-sectional view taken along line VII-VII of FIG. 6.

The third embodiment will be described with reference to FIGS. 5, 6 and 7. In the present embodiment, the arrangement of the air-conditioning unit 6 in the center console 5 is different from that in the first embodiment, such that the protection region is different.

Figure 5:
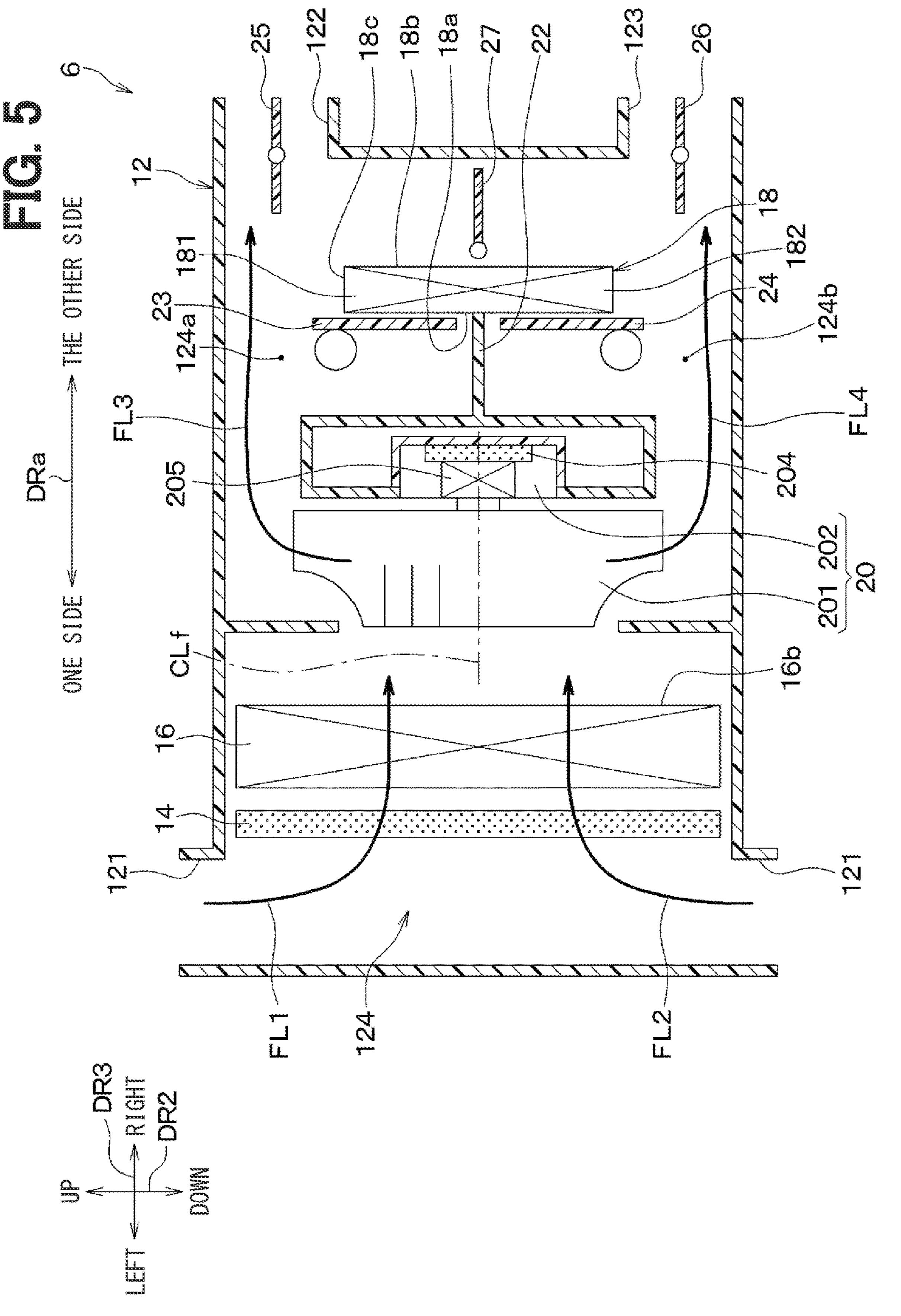
FIG. 5 is a sectional view illustrating an air-conditioning unit according to a third embodiment.

Specifically, as shown in FIG. 5, the fan axial direction DRa extends along the width direction DR3. Therefore, in the air-conditioning unit 6, the evaporator 16, the blower 20, and the heater core 18 are arranged in this order in the width direction DR3. As shown in FIGS. 6 and 7, in the vehicle 1 of the present embodiment, an article holder 51 is disposed in a lower part of the dashboard 40 in the up-down direction DR2 at position adjacent to the driver seat 41. An article holder 52 is disposed in a lower part of the dashboard 40 in the up-down direction DR2 at position adjacent to the front passenger seat 42.

The article holder 51, 52 is a holding member provided to hold and store small articles in the vehicle cabin 4. The article holder 51, 52 may be capable of transitioning between a state in which the article holder is stored inside the dashboard 40 and a state in which the article holder protrudes rearward in the front-rear direction DR1 from the dashboard 40 such that small items can be taken in and out. In the former state, the occupant cannot touch the small articles held in the article holder 51, 52, but in the latter state, the occupant can touch the small articles held in the article holder 51, 52.

The position of the article holder 51 in the width direction DR3 is on the opposite side of the front passenger seat 42 with respect to the position of the driver seat 41 in the width direction DR3. The position of the article holder 52 in the width direction DR3 overlaps the position of the front passenger seat 42 in the width direction DR3.

The position of the article holder 51, 52 in the up-down direction DR2 is lower than the position of the air-conditioning unit 6 in the up-down direction DR2. The position of the article holder 51, 52 in the front-rear direction DR1 overlaps with the position of the air-conditioning unit 6 in the front-rear direction DR1.

The positional relationship among the circuit unit 204, which is a noise source, the heater core 18, and the article holder 51 will be described. The heater core 18 is disposed between the circuit unit 204 and the protection region G1. Accordingly, a part or the whole of the circuit unit 204 is hidden from the protection region G1 by the heater core 18. That is, for any combination of the position included in the protection region G1 and the position included in the part or the whole of the circuit unit 204, a straight line connecting the two positions passes through the heater core 18.

The protection region G1 includes a part of a space region outside the air-conditioning unit 6 in the vehicle cabin 4. The protection region G1 includes a part of a space region inside the dashboard 40 and a part of a space region outside the dashboard 40 (such as an occupant foot space F1 of the driver seat 41) in the vehicle cabin 4. More specifically, the circuit unit 204 and the heater core 18 are arranged such that the protection region G1 includes the position of the article holder 51. Both in the state being stored in the dashboard 40 and in the state protruding from the dashboard 40, the article holder 51 is within the protection region G1. The one plate surface of the outer shape of the heater core 18 faces the circuit unit 204. The other plate surface of the outer shape of the heater core 18 may face or may not face the article holder 51.

Next, the positional relationship among the circuit unit 204, which is a noise source, the evaporator 16, and the article holder 52 will be described. The evaporator 16 is disposed between the circuit unit 204 and the protection region G2. Accordingly, a part or the whole of the circuit unit 204 is hidden from the protection region G2 by the evaporator 16. That is, for any combination of the position included in the protection region G2 and the position included in the part or the whole of the circuit unit 204, a straight line connecting the two positions passes through the evaporator 16.

The protection region G2 includes a part of a space region outside the air-conditioning unit 6 in the vehicle cabin 4. The protection region G2 includes a part of a space region inside the dashboard 40 and a part of a space region outside the dashboard 40 (such as an occupant foot space F2 of the front passenger seat 42) in the vehicle cabin 4. More specifically, the circuit unit 204 and the evaporator 16 are arranged such that the protection region G2 includes the position of the article holder 52. Both in the state being stored in the dashboard 40 and in the state protruding from the dashboard 40, the article holder 52 is within the protection region G2. The one plate surface of the outer shape of the evaporator 16 faces the circuit unit 204. The other plate surface of the outer shape of the evaporator 16 may or may not face the article holder 52.

As described above, in the present embodiment, the circuit unit 204, which is a noise source, is located between the two functional components having electromagnetic wave shielding properties, that is, the evaporator 16 and the heater core 18. Therefore, electromagnetic noise generated in the circuit unit 204 can be shielded in a wide solid angle range around the circuit unit 204. Both the evaporator 16 and the heater core 18 have a space in the vehicle cabin 4 on the opposite side of the circuit unit 204. As a result, the plural protection regions G1 and G2 are formed to be separated from each other without overlapping each other in the vehicle cabin 4. Then, the electronic device placed in the protection regions G1 and G2 such as the article holder 51,52 is less likely to be affected by the electromagnetic noise generated from the circuit unit 204, and the electronic device operates well.

Since both the plate surface of the heater core 18 and the plate surface of the evaporator 16 face the circuit unit 204, the electromagnetic noise generated from the circuit unit 204 can be shielded by the postures of the heater core 18 and the evaporator 16 suitable for the outer shapes of the heater core 18 and the evaporator 16.

The same effects as those of the first embodiment can be obtained from the configuration similar to that of the first embodiment. Further, in the same manner as the second embodiment is applied to the first embodiment, the blower motor 202 can be replaced with a brushed motor in the present embodiment. In this case, as in the second embodiment, the commutator 206 and the brush 207 become noise source.

Other Embodiments

The present disclosure is not limited to the above-described embodiments, and can be appropriately modified. In addition, the embodiments described above are not unrelated to each other, and can be appropriately combined unless the combination is obviously impossible. The constituent element(s) of each of the above embodiments is/are not necessarily essential unless it is specifically stated that the constituent element(s) is/are essential in the above embodiments, or unless the constituent element(s) is/are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. In particular, when multiple values are exemplified for a certain amount, it is also possible to adopt a value between the multiple values unless otherwise specified or when it is clearly impossible in principle. In each of the above embodiments, when the shape, positional relationship, and the like of the constituent elements and the like are referred to, the shape, the positional relationship, and the like are not limited unless otherwise specified or limited to specific shapes, positional relationships, and the like in principle. In addition, the present disclosure also includes the following modifications and modifications within a range of equivalency. The following modifications can be independently selected to be applied or not applied to the above-described embodiments. That is, the following modifications may be properly combined with one another, and may be applied to the above embodiments.

First Modification

In the above embodiment, the heater core 18 and the evaporator 16 are exemplified as functional components that shield electromagnetic noise from a noise source. However, the protection region may be formed in the vehicle cabin 4 by shielding the noise with a functional component other than these.

For example, a movable component such as the upper layer air mix door 23 or the lower layer air mix door 24 may include a substance that shields electromagnetic noise, thereby shielding electromagnetic noise of a noise source and forming a protection region in the vehicle cabin 4. The upper layer air mix door 23 and the lower layer air mix door 24 realize a function of adjusting the degree of heating of air among the air-conditioning functions.

For example, a movable component such as a blade of the blower fan 201 may mainly include a substance that shields electromagnetic noise, thereby shielding electromagnetic noise of a noise source and forming a protection region in the vehicle cabin 4. In this case, the blower fan 201 is disposed closer to the vehicle cabin 4 than the noise source. The blade of the blower fan 201 realizes an air blowing function among the air-conditioning functions.

In addition, the functional component that realizes the air-conditioning function other than the heating function, the cooling function, the function of adjusting the degree of heating, and the air blowing function may mainly include a substance that shields electromagnetic noise, thereby shielding the electromagnetic noise of the noise source and forming the protection region in the vehicle cabin 4. Such a functional component may be, for example, the face door 25 or the foot door 26 that realizes an air distribution function to adjust a destination of air in the vehicle cabin 4. In addition, such a functional component may be the filter 14 that realizes a function of cleaning the air in the vehicle cabin 4. Such a functional component may be a device providing an odor to the air in the vehicle cabin 4. Further, such a functional component may be a device that realizes a humidification function of increasing the humidity of air in the vehicle cabin 4.

Second Modification

In the above embodiment, the protection region formed by the shielding of the electromagnetic noise by the functional component occupies only a part of the vehicle cabin 4. However, the protection region may occupy the entire vehicle cabin 4.

Third Modification

In the above embodiment, the protection region includes the position of the holding member provided to hold an object carried by the occupant in the vehicle cabin 4. However, the protection region may not include such a position of the holding member.

Fourth Modification

In the above embodiment, the positions of the circuit unit 204, the commutator 206, and the brush 207, which are noise sources, in the width direction DR3 are between the driver seat 41 and the front passenger seat 42. However, the position of the noise source in the width direction DR3 may be other than between the driver seat 41 and the front passenger seat 42.

Fifth Modification

In the above embodiment, the evaporator 16, the blower 20, and the heater core 18 are arranged in this order from the upstream side in the air flow. However, the layout of the evaporator 16, the blower 20, and the heater core 18 in the air-conditioning unit 6 is not limited to such a layout. For example, the blower 20, the evaporator 16, and the heater core 18 may be arranged in this order from the upstream side in the air flow, or may be arranged in another layout.

Sixth Modification

In the above embodiment, the air-conditioning unit 6 has a blowing function, a heating function, and a cooling function. However, the air-conditioning unit 6 does not need to have all of these functions. For example, only the cooling function and the blowing function may be provided, or only the blowing function may be provided. Alternatively, the air-conditioning unit 6 may have only the blowing function and the humidifying function.

What is claimed is:

1. An air-conditioning unit installed in a vehicle, comprising:

an air-conditioning case;

a blower to send air from the air-conditioning case into a cabin of the vehicle;

a blower motor to drive the blower; and a functional component to realize a part of an air-conditioning function in the air-conditioning case, wherein the functional component is disposed between a noise source of the blower motor that generates electromagnetic noise and a protection region that is at least a part of the cabin, the functional component includes a substance that shields the electromagnetic noise, a straight line connecting a first position included in the protection region and a second position included in part or whole of the noise source penetrates the functional component for any combination of the first position and the second position, and the noise source and the functional component are arranged such that the protection region includes a position of a holding member provided to hold an object carried by an occupant in the cabin at a time of manufacturing the vehicle.

2. The air-conditioning unit according to claim 1, wherein a position of the noise source in a width direction of the vehicle is between a driver seat and a front passenger seat, and a position of the holding member in the width direction of the vehicle is between the driver seat and the front passenger seat.

3. The air-conditioning unit according to claim 1, wherein an outer shape of the functional component is a plate shape, one plate surface of the functional component faces the noise source, and the other plate surface of the functional component faces the holding member.

4. The air-conditioning unit according to claim 1, wherein the functional component is a heat exchanger in which heat is exchanged between air in the air-conditioning case and another medium.

5. The air-conditioning unit according to claim 4, wherein the heat exchanger is a heating heat exchanger to heat air in the air-conditioning case, and further comprising: a cooling heat exchanger to cool air in the air-conditioning case, wherein the blower is located downstream of the cooling heat exchanger and upstream of the heating heat exchanger in an air flow in the air-conditioning case.

6. The air-conditioning unit according to claim 1, wherein the functional component is one of a heat exchanger in which heat is exchanged between air in the air-conditioning case and another medium; an air mix door to mix air in the air-conditioning case; an air outlet door to adjust a destination of air in the cabin; or a filter to capture dust contained in air, and the noise source is one of a circuit, a commutator or a brush of the blower motor.

7. The air-conditioning unit according to claim 1, wherein the holding member is located, in a cross-sectional view, between a first imaginary line connecting an end of the noise source and an end of the functional component adjacent to the noise source and a second imaginary line connecting another end of the noise source and another end of the functional component adjacent to the noise source.

8. The air-conditioning unit according to claim 1, wherein the holding member is configured to hold an electronic wireless key or a portable information communication terminal, and the protection region is arranged to prevent electrical interference, due to the electromagnetic noise, with the electronic wireless key or the portable information communication terminal.

9. A method of arranging an air-conditioning unit in a vehicle, comprising disposing the air-conditioning unit in the vehicle, the air-conditioning unit including:

an air-conditioning case; a blower to send air from the air-conditioning case into a cabin of the vehicle; a blower motor to drive the blower; and a functional component to realize a part of an air-conditioning function in the air-conditioning case, the functional component including a substance that shields electromagnetic noise, the disposing includes placing the functional component between a noise source of the blower motor that generates the electromagnetic noise and a protection region that is at least a part of the cabin, and placing the noise source and the functional component such that the protection region includes a position of a holding member provided to hold an object carried by an occupant in the cabin at a time of manufacturing the vehicle, wherein a straight line connecting a first position included in the protection region and a second position included in part or whole of the noise source penetrates the functional component for any combination of the first position and the second position.

10. The method according to claim 9, wherein the disposing includes locating a position of the noise source in a width direction of the vehicle between a driver seat and a front passenger seat, and locating a position of the holding member in the width direction of the vehicle between the driver seat and the front passenger seat.

11. The method according to claim 9, wherein the functional component is one of a heat exchanger in which heat is exchanged between air in the air-conditioning case and another medium; an air mix door to mix air in the air-conditioning case; an air outlet door to adjust a destination of air in the cabin; or a filter to capture dust contained in air, and the noise source is one of a circuit, a commutator or a brush of the blower motor.

12. The method according to claim 9, wherein the holding member is located, in a cross-sectional view, between a first imaginary line connecting an end of the noise source and an end of the functional component adjacent to the noise source and a second imaginary line connecting another end of the noise source and another end of the functional component adjacent to the noise source.

13. The method according to claim 9, wherein the holding member is configured to hold an electronic wireless key or a portable information communication terminal, and the protection region is arranged to prevent electrical interference, due to the electromagnetic noise, with the electronic wireless key or the portable information communication terminal.

14. A vehicle comprising an air-conditioning unit and a holding member, wherein the holding member is provided to hold an object carried by an occupant in a cabin of the vehicle at a time of manufacturing the vehicle, the air-conditioning unit includes: an air-conditioning case; a blower to send air from the air-conditioning case into a cabin of the vehicle; a blower motor to drive the blower; and a functional component to realize a part of an air-conditioning function in the air-conditioning case, the functional component is located between a noise source of the blower motor that generates electromagnetic noise and a protection region that is at least a part of the cabin, and includes a substance that shields the electromagnetic noise, and a straight line connecting a first position included in the protection region and a second position included in part or whole of the noise source penetrates the functional component for any combination of the first position and the second position, the noise source and the functional component are located such that the protection region includes a position of the holding member.

15. The vehicle according to claim 14, wherein a position of the noise source in a width direction of the vehicle is between a driver seat and a front passenger seat, and a position of the holding member in the width direction of the vehicle is between the driver seat and the front passenger seat.

16. The vehicle according to claim 14, wherein the functional component is one of a heat exchanger in which heat is exchanged between air in the air-conditioning case and another medium; an air mix door to mix air in the air-conditioning case; an air outlet door to adjust a destination of air in the cabin; or a filter to capture dust contained in air, and the noise source is one of a circuit, a commutator or a brush of the blower motor.

17. The vehicle according to claim 14, wherein the holding member is located, in a cross-sectional view, between a first imaginary line connecting an end of the noise source and an end of the functional component adjacent to the noise source and a second imaginary line connecting another end of the noise source and another end of the functional component adjacent to the noise source.

18. The vehicle according to claim 14, wherein the holding member is configured to hold an electronic wireless key or a portable information communication terminal, and the protection region is arranged to prevent electrical interference, due to the electromagnetic noise, with the electronic wireless key or the portable information communication terminal.

* * * * *